(12) United States Patent
Zhao (10) Patent No.: US 8,805,242 B2
(45) Date of Patent: Aug. 12, 2014

(54) PROCESS CARTRIDGE

(75) Inventor: Chunyong Zhao, Jiangxi (CN)

(73) Assignee: Jiangxi Yibo E-Tech Co., Ltd., Jiangxi (CN)

( * ) Notice: Subject to any disclaimer, the term of this patent is extended or adjusted under 35 U.S.C. 154(b) by 374 days.

(21) Appl. No.: 13/213,489

(22) Filed: Aug. 19, 2011

(65) Prior Publication Data

US 2012/0257906 A1 Oct. 11, 2012

(30) Foreign Application Priority Data

Apr. 8, 2011 (CN) .................. 2011 2 0110390 U (51) Int. Cl.
    *G03G 21/18* (2006.01)
    *G03G 15/00* (2006.01)

(52) U.S. Cl.
    USPC ............................................... 399/167

(58) Field of Classification Search
    CPC .................................................. G03G 15/757
    USPC ........................................................ 399/167
    See application file for complete search history.

(56) References Cited

U.S. PATENT DOCUMENTS

| 6,029,032 | A | * | 2/2000 | Watanabe et al. | 399/111 |
| 6,173,146 | B1 | | 1/2001 | Wang | |
| 6,684,041 | B2 | * | 1/2004 | Yokomori et al. | 399/167 |
| 7,236,722 | B2 | * | 6/2007 | Portig | 399/167 |
| 7,813,676 | B2 | | 10/2010 | Huck | |
| 8,036,574 | B2 | * | 10/2011 | Shimura et al. | 399/167 |

FOREIGN PATENT DOCUMENTS

| CN | 201897693 | | 7/2011 |
| CN | 202067077 U | * | 12/2011 |

OTHER PUBLICATIONS

Translation of CN 202067077 U—publication dated Dec. 7, 2011 of Priority Application CN 201120110390.*

* cited by examiner

*Primary Examiner* — Clayton E Laballe
*Assistant Examiner* — Leon W Rhodes, Jr.
(74) *Attorney, Agent, or Firm* — Pearne & Gordon LLP (57) ABSTRACT

The present invention relates to a process cartridge, comprising a photosensitive drum driving component in conjunction with an image forming apparatus driving head, wherein said image forming apparatus driving head includes a twisted recess and said photosensitive drum driving component includes a drum gear provided at an end of a photosensitive drum and connected to the photosensitive drum, a drum shaft outwardly projected in an axis direction from an end of the drum gear for rotatably supporting said photosensitive drum during operation and a boss outwardly projected from an end surface of the drum shaft. A first teeth and a second teeth in a radial direction of the boss are provided on a side wall of said boss, wherein said first teeth is engaged with a twisted-section of the twisted recess in said image forming apparatus and said second teeth is engaged with an end surface edge of other twisted-sections of the twisted recess in said image forming apparatus. Thereby, the process cartridge according to this invention ensures an effectively and continuously transmitted driving force and contains a simple prepared photosensitive drum driving head, which will be less damaged even during long time operation.

9 Claims, 6 Drawing Sheets

(Prior Art)

PROCESS CARTRIDGE

FIELD OF THE INVENTION

The present invention relates to a process cartridge, especially a process cartridge used for an image forming apparatus.

BACKGROUND TO THE INVENTION

The process cartridge can be detachably mounted into a main part of an image forming apparatus, and the process cartridge, as a whole unit, comprises of an electrophotographic photosensitive member and at least one of processing means such as charging means, developing means, cleaning means, or the like. Since the process cartridge is detachably mountable relative to the main part of the device, it is easy to maintain the device. An electrophotographic image forming apparatus functions through electrophotographic image formation in the manner that an electrostatic latent image is formed by selectively exposing the electrophotographic photosensitive member uniformly charged by a charger to light from the image forming apparatus. The electrostatic latent image is developed with toner by a developing means into a toner image. The toner image thus formed is transferred onto a recording medium by a transferring means to form an image on the recording material.

Figure 1:
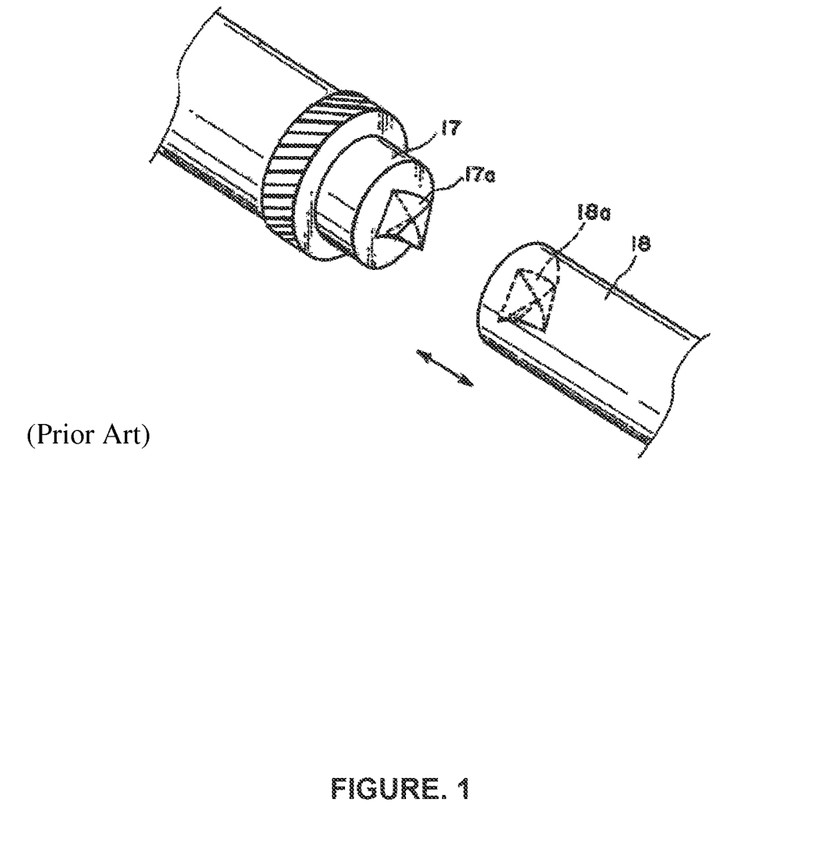
FIG. 1 is a decomposition diagram of a structure of an image forming apparatus driving head and a photosensitive drum driving head in the art.

As shown in FIG. 1, the prior art has disclosed a method of transmitting the driving force between a photosensitive drum driving head 17 provided to the process cartridge and a image forming apparatus driving head 18, wherein a spiral triangular recess 18a is provided at an end of the image forming apparatus driving head 18, and a spiral triangular projection 17a is provided correspondingly at an end of the photosensitive drum driving head 17 in complementary with the triangular recess 18a for transmission. This method is effective for transmitting the driving force. However, the process of manufacturing such a spiral triangular projection 17a is complicated, the cost of making mould is high, and the photosensitive drum driving head 17 is easy to deform or damage during long time operation, which will affect the driving accuracy and efficiency.

Additionally, according to the prior art, manufacturing spiral projection and spiral recess requires high accuracy, so there is frequently poor contact between the spiral triangular projection 17a and triangular recess 18a. It is difficult for the rotating center of the triangular recess 18a to achieve coaxial centering, which causes unnecessary sloshing between the projection and the recess during driving force transmission.

Thus, in configuration and use, conventional process cartridges still has disadvantages and defects to be further improved. To solve the problems, every concerned manufacturer brainstorms for a better solution. However, since years ago, no suitable device has been developed and any existing product lacks of appropriate structure for the improvement as well. Obviously, person skilled in the art may be anxious to approach to the problems. Therefore, how to invent a process cartridge with new structure is indeed one of the most important studies recently, also an object in the current industry.

In view of said defects of the process cartridges in existence, the present inventor, based on his practical experience and specialized knowledge in the design and manufacture of such products for many years, is working on research and innovation in combination of theory for designing a process cartridge with non-conventional structure so as to improve the prior technology and make it more commercial. Through continual invention and modification, together with repetitiously preparing samples and making improvements, the present invention having certain practical value is finally created.

SUMMARY OF THE INVENTION

It is a principal object of the present invention to overcome existing defects in process cartridges in order to provide a new configured one, wherein the technical problem to be solved is the complex manufacturing process of the photosensitive drum driving head in the art and the frequent deformation and damage during long time operation thereof, which will affect the driving accuracy and efficiency, so it is applicable in market.

The object of the present invention and the resolved technical problems are fulfilled by the following technical solution. The present invention provides a process cartridge comprising a charging means, a developing means, a cleaning means and a photosensitive drum driving component in conjunction with an image forming apparatus driving head, wherein the image forming apparatus driving head includes a recess that may be a hole having three twisted-sections, each of which contains an end surface edge.

The photosensitive drum driving component includes a drum gear provided at an end of the photosensitive drum and connected to the photosensitive drum, a drum shaft outwardly projected in an axis direction from an end of the drum gear for rotatably supporting the photosensitive drum and a boss outwardly projected from an end surface of the drum shaft.

A first teeth and a second teeth in a radial direction of the boss are provided on a side wall of the boss, wherein the first teeth is obliquely mounted on the side wall of the boss and the second teeth outwardly projected along the radial direction of the boss is vertically mounted on the end surface of the drum shaft.

The first teeth is engaged with a twisted-section of the twisted recess in the image forming apparatus and the second teeth is engaged with an end surface edge of other twisted-sections of the twisted recess in the image forming apparatus.

The boss synchronously rotated with the image forming apparatus driving head transmits the received driving force to the photosensitive drum through a drum shaft and a drum gear connected to the boss in order to drive the photosensitive drum.

The object of the present invention and the resolved technical problems are further fulfilled by the following technical means.

According to the process cartridge as mentioned above, one second teeth that is engaged with one end surface edge of the twisted-sections is provided.

According to the process cartridge as mentioned above, two second tooth that are engaged with two end surface edges of the twisted-sections, respectively, are provided.

According to the process cartridge as mentioned above, a section perpendicular to a cross-section in the radial direction of the boss is provided in the position where the first teeth is mounted on the boss, wherein the oblique direction of the first teeth is parallel to the boss section.

According to the process cartridge as mentioned above, the boss, the first teeth, the second teeth, the drum shaft and the drum gear included in the photosensitive drum driving component are integrally formed by identical material, which is preferably selected from high-strength resin or metal such as copper and copper based alloy.

According to the process cartridge as mentioned above, the high-strength resin may be polyformaldehyde (POM), polycarbonate (PC) or acrylonitrile butadiene styrene copolymerization (ABS).

Through these technical solutions, a process cartridge according to the present invention has at least advantages and beneficial effects as follows:

1. The first teeth and the second teeth of the photosensitive drum driving component are engaged with the twisted-section and twisted end surface edge of the recess in the image forming apparatus driving head respectively, which guarantees an effective and continuous transmission of the driving force;

2. The photosensitive drum driving head according to the technical solutions has a simple configuration, with simplified the technological process, and the photosensitive drum driving component can be manufactured in a cost effective manner;

3. In the driving force transmission process according to the technical solutions, the boss positioned at the end of the drum gear is tangent to the twisted section of the triangular recess for the rotating center between the boss and the recess to remain coaxial centering, which may avoid the sloshing of the photosensitive drum driving head in the triangular recess, giving security for transmitting the driving force continuously.

4. The photosensitive drum driving head according to the technical solutions is less damaged even during long time operation, with prolonged lifetime.

The technical solutions have resolved the technical problems, such as complex manufacturing process of the photosensitive drum driving head, as a driving force transmission means, in a conventional image forming apparatus, high cost for making mould and the frequent deformation and damage during long time operation, which will affect the driving accuracy and efficiency.

In conclusion, the present invention relates to a process cartridge, comprising a photosensitive drum driving component in conjunction with an image forming apparatus driving head, wherein said image forming apparatus driving head includes a twisted recess and said photosensitive drum driving component includes a drum gear provided at an end of a photosensitive drum and connected to the photosensitive drum, a drum shaft outwardly projected in an axis direction from an end of the drum gear for rotatably supporting said photosensitive drum during operation and a boss outwardly projected from an end surface of the drum shaft. A first teeth and a second teeth in a radial direction of the boss are provided on a side wall of said boss, wherein said first teeth is engaged with a twisted-section of the twisted recess in said image forming apparatus and said second teeth is engaged with an end surface edge of other twisted-sections of the twisted recess in said image forming apparatus. Thereby, the process cartridge according to this invention ensures an effectively and continuously transmitted driving force and contains a simple prepared photosensitive drum driving head, which will be less damaged even during long time operation. The present invention represents a notable technological advance and has significant active effects. Accordingly, the present invention shall be a novel, developed and commercial product.

It is to be understood, however, that above-discussed illustration is only a brief introduction of the present invention. To allow persons skilled in the art to better understand the technical features and implement the present invention in accordance with the specification, further tasks, characteristics and advantages of the invention may be understood by referring to the description of preferred embodiments included in the following and to the drawing herein.

DESCRIPTION FO THE PREFERRED EMBODIMENTS

In order to further illustrate the technical means and functions of the invention for realizing expected results, a process cartridge according to the present invention, together with the specific implementation, structures, features and functions thereof, will be discussed upon the drawings and preferred embodiments.

Referring to foregoing and other technical contents, features and functions of the present invention, it can be shown apparently in the following description of the preferred embodiments in conjunction with the accompanying drawings. For illustration purposes, the same elements are represented by the same reference numerals in the following embodiments. It should be understood that the specific embodiments described below only serve to explain the present invention, but are not meant to limit the scope of the present invention.

Embodiment 1

Figure 2:
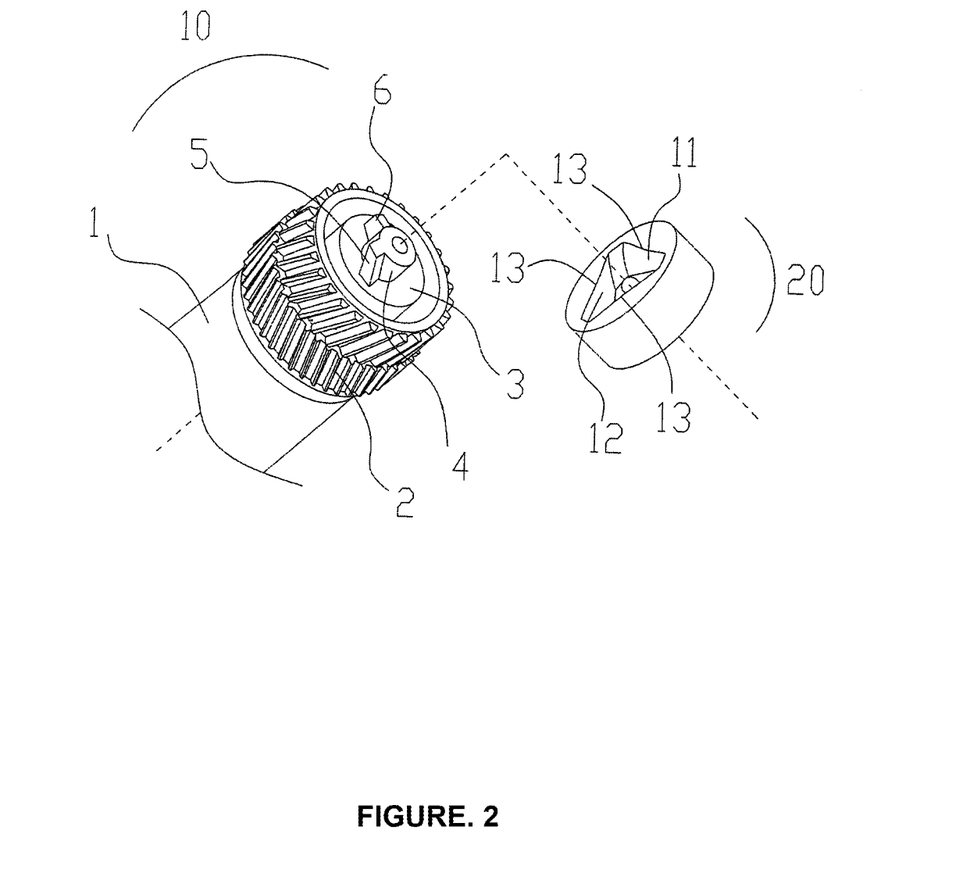
FIG. 2 is a decomposition diagram of a structure of a photosensitive drum driving component and an image forming apparatus driving head according to a first embodiment of the present invention.
Figure 6:
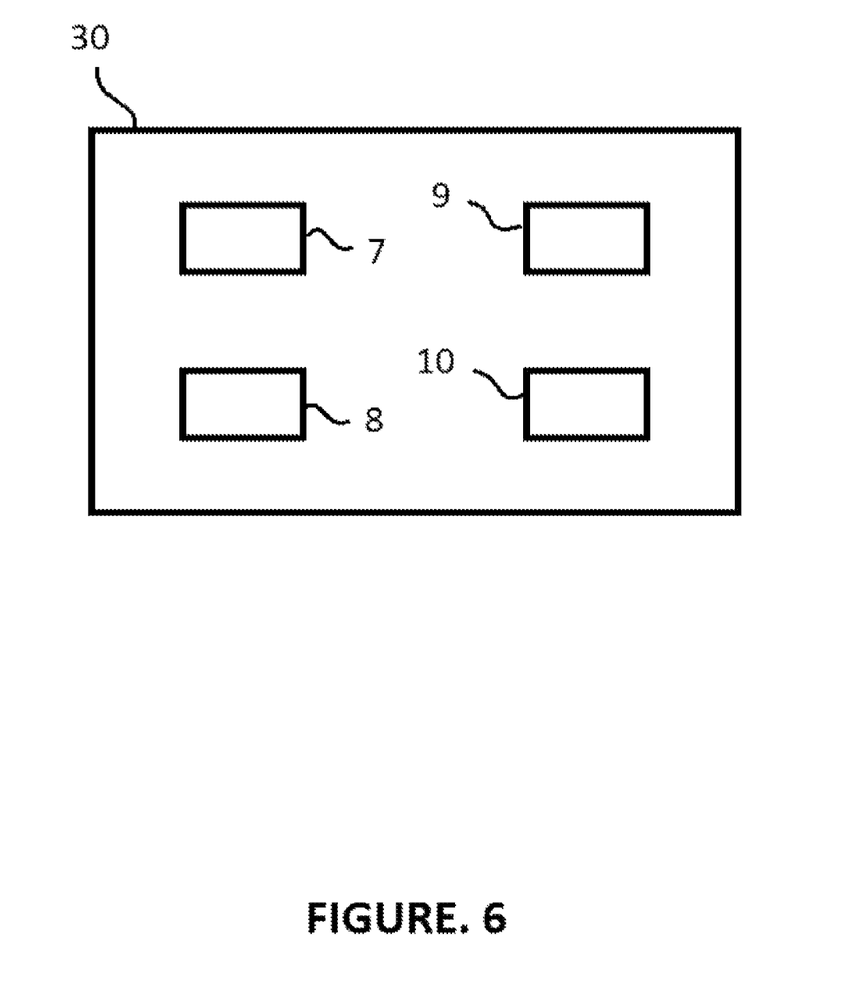
FIG. 6 is a decomposition diagram of a process cartridge comprising a charging member, a developing member, a cleaning member and a photosensitive drum driving component.

As shown in FIG. 6, a process cartridge 30 according to a preferred embodiment of the present invention comprises a charging means or member 7, a developing means or member 8, a cleaning means or member 9 and a photosensitive drum driving component 10. As shown in FIG. 2, the photosensitive drum driving component 10 provided in the process cartridge 30 includes a drum gear 2 provided at an end of a photosensitive drum 1 and connected to the photosensitive drum 1 for transmitting the received driving force to the photosensitive drum 1, a drum shaft 3 outwardly projected in an axis direction from an end of the drum gear 2 for rotatably supporting the photosensitive drum 1 during the operation of the process cartridge and a boss 4 outwardly projected in an axis direction from an end surface of the drum shaft 3 for receiving driving force from an image forming apparatus driving head 20. A first teeth 5 and a second teeth 6 in a radial direction of the boss 4 are provided on a side wall of the boss 4, wherein the first teeth 5 is obliquely mounted on the side wall of the boss and the second teeth 6 outwardly projected along the radial direction of the boss is vertically mounted on the end surface of the drum shaft. Additionally, the boss 4, the first teeth 5, the second teeth 6, the drum shaft 3 and the drum gear 2 included in the photosensitive drum driving component are integrally formed by identical material, for material strength and performance consideration, which is preferably selected from high-strength resin, for example, polyformaldehyde (POM), polycarbonate (PC), acrylonitrile butadiene styrene copolymerization (ABS) or the like, or metal such as copper and copper based alloy.

The image forming apparatus driving head 20 in conjunction with the photosensitive drum driving component 10 of the present invention includes a recess 11 that may be a hole having three twisted-sections 12, each of which contains an end surface edge 13. When the process cartridge is mounted to the image forming apparatus, the boss 4 can be inserted into the twisted recess 11, wherein the first teeth 5 mounted on the boss 4 is engaged with one of the twisted-sections 12 of the recess 11 and the second teeth 6 mounted on the boss 4 is engaged with one of the end surface edges 13 of the other two twisted-sections 12.

Since the first teeth 5 engaged with the image forming apparatus driving head 20 for transmission is oblique so as to produce an axial tension between the image forming apparatus driving head 20 and the photosensitive drum driving component 10 in the process of joint with each other, it is easier to make the photosensitive drum driving component 10 and the image forming apparatus driving head 20 in mesh, simultaneously, the photosensitive drum driving component 10 will not be caused to depart from the image forming apparatus driving head 20 in rotation of the image forming apparatus. While the image forming apparatus driving head 20 is rotated, the first teeth 5 mounted on the boss 4 is engaged with one twisted-section 12 of the recess 11 on the driving head, the second teeth 6 is engaged with one of two end surface edges 13 relative to the end surfaces of other two twisted-sections 12 for rotating the boss 4, thereby it is able to realize a synchronization in respect of rotation of the boss 4 and the image forming apparatus driving head 20, and finally the boss 4 transmits the driving force received from the image forming apparatus driving head 20 to the photosensitive drum 1 through a drum shaft 3 and a drum gear 2 connected to the boss in order to drive the photosensitive drum 1.

Embodiment 2

Figure 3:
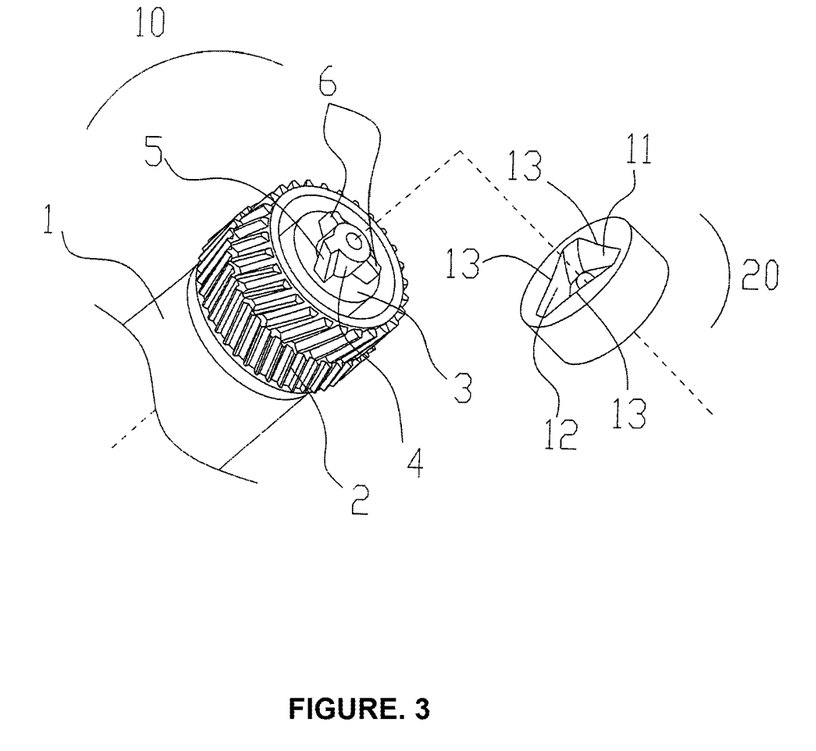
FIG. 3 is a decomposition diagram of a structure of a photosensitive drum driving component and an image forming apparatus driving head according to a second embodiment of the present invention.

In the first embodiment, the photosensitive drum driving component 10 is driven by forming two points for bearing stress between both of the first teeth 5 and the second teeth 6 and the image forming apparatus driving head 20. To enhance the stability and reliability of the transmission thereof, in this embodiment as shown in FIG. 3, one more second teeth 6 outwardly projected along the radial direction of the boss 4 is additionally mounted on the boss 4 in the photosensitive drum driving component 10, compared to the first embodiment. Accordingly, three points is formed for meshing transmission while the photosensitive drum driving component 10 is engaged with the image forming apparatus driving head 20, more effective in ensuring continuous transmission.

Embodiment 3

Figure 4:
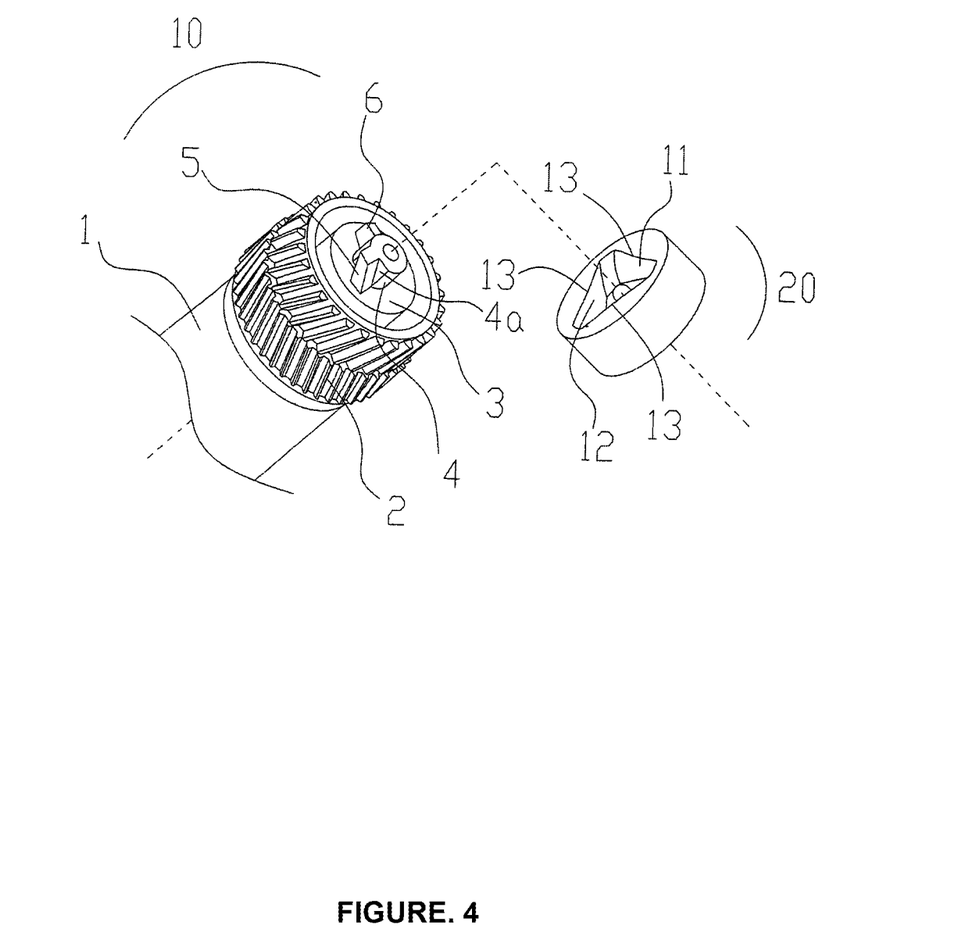
FIG. 4 or FIG. 5 is a decomposition diagram of a structure of a photosensitive drum driving component and an image forming apparatus driving head according to a third embodiment of the present invention.
Figure 5:
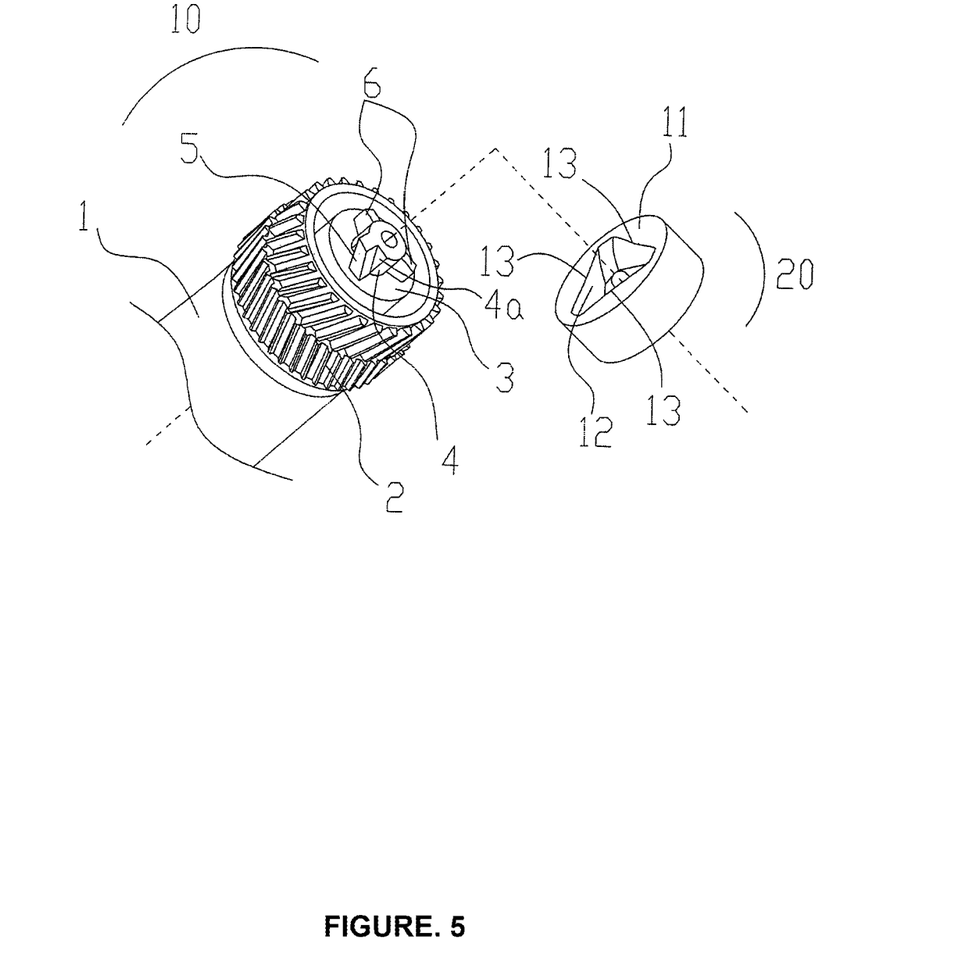

In this embodiment, as shown in FIG. 4 and FIG. 5, a section 4a perpendicular to a cross-section in the radial direction of the boss 4 is provided on the boss in the photosensitive drum driving component 10, wherein the first teeth 5 is mounted on the boss section 4a and the oblique direction of the first teeth 5 is parallel to the boss section 4a, thereby achieving advantages of better formation of a photosensitive drum driving component 10 with a first oblique teeth 5, simplified the technological process and cost saving.

The image forming apparatus driving head 20 in conjunction with the photosensitive drum driving component 10 of the present invention includes a recess 11 that may be a hole having three twisted-sections 12, each of which contains an end surface edge 13. When the process cartridge is mounted to the image forming apparatus, the boss 4 can be inserted into the twisted recess 11, wherein the first teeth 5 mounted on the boss 4 is engaged with one of the twisted-sections 12 of the recess 11.

And on the boss 4, one second teeth 6 that is engaged with one end surface edge 13 of the twisted-sections 12 may be provided.

Also on the boss 4, two second tooth 6 that are engaged with two end surface edges 13 of the twisted-sections 12, respectively, may be provided.

Hereinabove, it is discussed preferred embodiments according to the present invention only, but is not meant to limit the present invention in formal. Although the present invention has disclosed preferred embodiments as above, any person skilled in the art can appropriately improve or modify the illustrated technical contents into equivalent embodiments without extending the scope of the technical solutions in the present invention. Any simple improvements, equivalents or modifications based on the principle of the invention, without extension of the technical contents of the invention, are within the scope of the invention.

The invention claimed is:

1. A process cartridge comprising a charging member, a developing member, a cleaning member and a photosensitive drum driving component in conjunction with an image forming apparatus driving head, wherein the image forming apparatus driving head (20) includes a recess (11) comprising a hole having three twisted-sections (12), each of which contains an end surface edge (13); wherein the photosensitive drum driving component includes a drum gear (2) provided at an end of the photosensitive drum (1) and connected to the photosensitive drum (1), a drum shaft (3) outwardly projected in an axis direction from an end of the drum gear (2) for rotatably supporting the photosensitive drum and a boss (4) outwardly projected from an end surface of the drum shaft (3);

a first tooth (5) and a second tooth (6) in a radial direction of the boss (4) are provided on a side wall of the boss (4), wherein the first tooth (5) is obliquely mounted on the side wall of the boss, the first tooth comprising a first longitudinal axis that is oblique to the axis direction of the drum shaft, further wherein the second tooth (6) outwardly projected along the radial direction of the boss (4) is vertically mounted on the end surface of the drum shaft, the second tooth comprising a second longitudinal axis that is vertical to the end surface and parallel to the axis direction;

the first tooth (5) is engaged with a twisted-section (12) of the twisted recess (11) in the image forming apparatus and the second tooth (6) is engaged with an end surface edge (13) of other twisted-sections (12) of the twisted recess (11) in the image forming apparatus;

the boss (4) synchronously rotated with the image forming apparatus driving head (20) transmits the received driving force to the photosensitive drum (1) through a drum shaft (3) and a drum gear (2) connected to the boss in order to drive the photosensitive drum (1).

2. A process cartridge according to claim 1, wherein the second tooth (6) is engaged with one end surface edge (13) of the twisted-sections (12).

3. A process cartridge according to claim 2, wherein a section (4a) perpendicular to a cross-section in the radial direction of the boss is provided in the position where the first tooth (5) is mounted on the boss (4), wherein the first longitudinal axis of the first tooth (5) is parallel to the boss section (4a).

4. A process cartridge according to claim 1, further comprising a third tooth, wherein the second tooth (6) and the third tooth are engaged with two end surface edges (13) of the twisted-sections (12).

5. A process cartridge according to claim 4, wherein a section (4a) perpendicular to a cross-section in the radial direction of the boss is provided in the position where the first tooth (5) is mounted on the boss (4), wherein the first longitudinal axis of the first tooth (5) is parallel to the boss section (4a).

6. A process cartridge according to claim 1, wherein a section (4a) perpendicular to a cross-section in the radial direction of the boss is provided in the position where the first tooth (5) is mounted on the boss (4), wherein the first longitudinal axis of the first tooth (5) is parallel to the boss section (4a).

7. A process cartridge according to claim 1, wherein the boss (4), the first tooth (5), the second tooth (6), the drum shaft (3) and the drum gear (2) included in the photosensitive drum driving component are integrally formed by identical material, which is selected from a group comprising resin and metal.

8. A process cartridge according to claim 7, wherein the resin is polyformaldehyde (POM), polycarbonate (PC) or acrylonitrile butadiene styrene copolymerization (ABS).

9. A process cartridge according to claim 7, wherein the metal is copper or a copper based alloy.

* * * * *

UNITED STATES PATENT AND TRADEMARK OFFICE
CERTIFICATE OF CORRECTION

PATENT NO. : 8,805,242 B2  Page 1 of 1
APPLICATION NO. : 13/213489
DATED : August 12, 2014
INVENTOR(S) : Chunyong Zhao It is certified that error appears in the above-identified patent and that said Letters Patent is hereby corrected as shown below:

On the title page, item (30) Foreign Application Priority Data, "2011 2 0110390 U" should read
-- 2011 2 0110390 --

Signed and Sealed this
Twenty-fifth Day of November, 2014

Michelle K. Lee
*Deputy Director of the United States Patent and Trademark Office*